(12) United States Patent
Lee et al.

(10) Patent No.: US 8,913,538 B2
(45) Date of Patent: Dec. 16, 2014

(54) METHOD OF RECEIVING MULTIMEDIA BROADCAST/MULTICAST SERVICE IN CELL-BASED WIRELESS COMMUNICATION SYSTEM

(75) Inventors: Young Dae Lee, Anyang-si (KR); Sung Jun Park, Anyang-si (KR); SeungJune Yi, Anyang-si (KR); SungDuck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 811 days.

(21) Appl. No.: 12/723,445

(22) Filed: Mar. 12, 2010

(65) Prior Publication Data

US 2011/0222457 A1 Sep. 15, 2011

(30) Foreign Application Priority Data

Mar. 10, 2010 (KR) .................. 10-2010-0021060

(51) Int. Cl.
  *H04H 20/71* (2008.01)
  *H04W 28/06* (2009.01)
  *H04W 4/06* (2009.01)
  *H04W 48/16* (2009.01)

(52) U.S. Cl.
  CPC ............ *H04W 28/06* (2013.01); *H04W 4/06* (2013.01); *H04W 48/16* (2013.01)
  USPC ............ 370/312; 370/310; 370/329; 370/335

(58) Field of Classification Search
  None
  See application file for complete search history.

(56) References Cited

U.S. PATENT DOCUMENTS

| | | | |
|---|---|---|---|
| 2008/0212546 A1* | 9/2008 | Fischer | 370/338 |
| 2008/0268878 A1* | 10/2008 | Wang et al. | 455/458 |
| 2010/0130218 A1* | 5/2010 | Zhang et al. | 455/450 |
| 2010/0238845 A1* | 9/2010 | Love et al. | 370/280 |
| 2011/0292858 A1* | 12/2011 | Jones et al. | 370/312 |

OTHER PUBLICATIONS

Alcatel, "Discussion of MBMS dedicated cell and paging configuration", Nov. 2006, pp. 1-3.*

* cited by examiner

*Primary Examiner* — Jackie Zuniga Abad
(74) *Attorney, Agent, or Firm* — Mckenna Long & Aldridge LLP

(57) ABSTRACT

A method of receiving multimedia broadcast/multicast service (MBMS) information by a user equipment (UE) in a cell-based wireless communication system is provided. The method includes receiving information regarding a second cell from a first cell over a first channel, and receiving the MBMS information from the second cell over a second channel based on the received information regarding the second cell. Information regarding a cell that transmits multimedia broadcast/multicast service (MBMS) information is obtained from a cell that does not transmit the MBMS information, thereby eventually receiving the MBMS information. Therefore, an overhead caused by broadcasting of unnecessary MBMS control information can be reduced.

7 Claims, 11 Drawing Sheets

METHOD OF RECEIVING MULTIMEDIA BROADCAST/MULTICAST SERVICE IN CELL-BASED WIRELESS COMMUNICATION SYSTEM

CROSS-REFERENCE TO RELATED APPLICATIONS

Pursuant to 35 U.S.C. §119, this application claims the benefit of earlier filing date and right of priority to to Korean Application No. 10-2010-0021060, filed on Mar. 10, 2010, and to U.S. Provisional Application No. 61/160,280, filed on Mar. 13, 2009, the contents of all of which are hereby incorporated by reference herein in their entirety.

BACKGROUND

1. Technical Field

The present invention relates to wireless communications, and more particularly, to a method of receiving a multimedia broadcast/multicast service (MBMS) in a cell-based wireless communication system.

2. Related Art

Similarly to a conventional cell broadcast service (CBS), a multimedia broadcast/multicast service (MBMS) simultaneously transmits a data packet in the same manner to a plurality of users. The CBS is a low-speed message-based service whereas the MBMS aims at high-speed multimedia data transmission. Further, the CBS is not based on an Internet protocol (IP) whereas the MBMS is based on IP multicast. If users satisfying a specific level exist in the same cell, necessary resources (or channels) transmitted to each user are shared so that a plurality of users can receive the same multimedia data. Therefore, the MBMS has an advantage in that radio resources can be more efficiently used and a multimedia service can be used at a low price from the perspective of the users.

The MBMS uses a common channel so that a plurality of user equipments (UEs) effectively receive data of one service. That is, regarding the data of one service, only one common channel is allocated instead of allocating a predetermined number of dedicated channels corresponding to the plurality of UEs which intend to receive the service in one cell. Since the plurality of UEs simultaneously receive the common channel, efficiency of radio resources increases.

The conventional MBMS service is provided in a single-carrier system. Herein, a carrier denotes one bandwidth and a center frequency. To provide various MBMS services to the same region, a hierarchical cell management method for providing different MBMS services over different frequency bands may be used. For example, when several cells having different frequencies are located in the same region, an MBMS service #1 may be transmitted from a first cell, and an MBMS service #2 may be transmitted from a second cell. In this case, there is a problem in that an MBMS UE located in the first cell cannot receive the MBMS service #2. This problem can be solved when the first cell reports information regarding the MBMS service #2 of the second cell to the UE.

However, when such a method applies to a multi-carrier or multi-cell system, an overhead caused by transmission of control information may occur. For example, it is assumed that a first carrier (or first cell) provides the MBMS service #1 and a second carrier (or second cell) does not provide any MBMS service in the same region. Even if the second carrier (or second cell) does not provide any MBMS service, when an additional control channel is transmitted for the MBMS service #1, an overhead caused by the control channel occurs.

The greater the number of other carriers (or cells) providing the MBMS service, the greater the overhead. This implies an increase in the amount of control information that needs to be received for the MBMS by the UE, thereby consequently increasing a reception overhead of the UE receiving the MBMS. Accordingly, there is a need for a method of effectively receiving the MBMS in a multi-carrier system.

SUMMARY

The present invention provides a method of receiving a multimedia broadcast/multicast service (MBMS) in a cell-based wireless communication system so as to smoothly receive the MBMS by effectively obtaining information regarding the MBMS.

According to an aspect of the present invention, a method of receiving multimedia broadcast/multicast service (MBMS) information by a user equipment (UE) in a cell-based wireless communication system is provided. The method includes receiving information regarding a second cell from a first cell over a first channel, and receiving the MBMS information from the second cell over a second channel based on the received information regarding the second cell. The first cell is a cell that provides a unicast service. The second cell is a cell that provides an MBMS service. The MBMS information is information regarding MBMS transmission of the second cell. And the first channel is a channel related to the unicast service.

According to another aspect of the present invention, a method of transmitting multimedia broadcast/multicast service (MBMS) information from a radio access network in a cell-based wireless communication system is provided. The method includes transmitting information regarding a second cell to a user equipment (UE) over a first channel of a first cell, and transmitting the MBMS information to the UE over a second channel of the second cell, in association with the transmitted information regarding the second cell. The first cell is a cell that provides a unicast service. The second cell is a cell that provides an MBMS service. The MBMS information is information on MBMS transmission of the second cell. And the first channel is a channel related to the unicast service.

DESCRIPTION OF EXEMPLARY EMBODIMENTS

Hereinafter, a method of receiving multimedia broadcast/multicast service (MBMS) and a method of transmitting the MBMS will be described according embodiments of the present invention.

Figure 1:
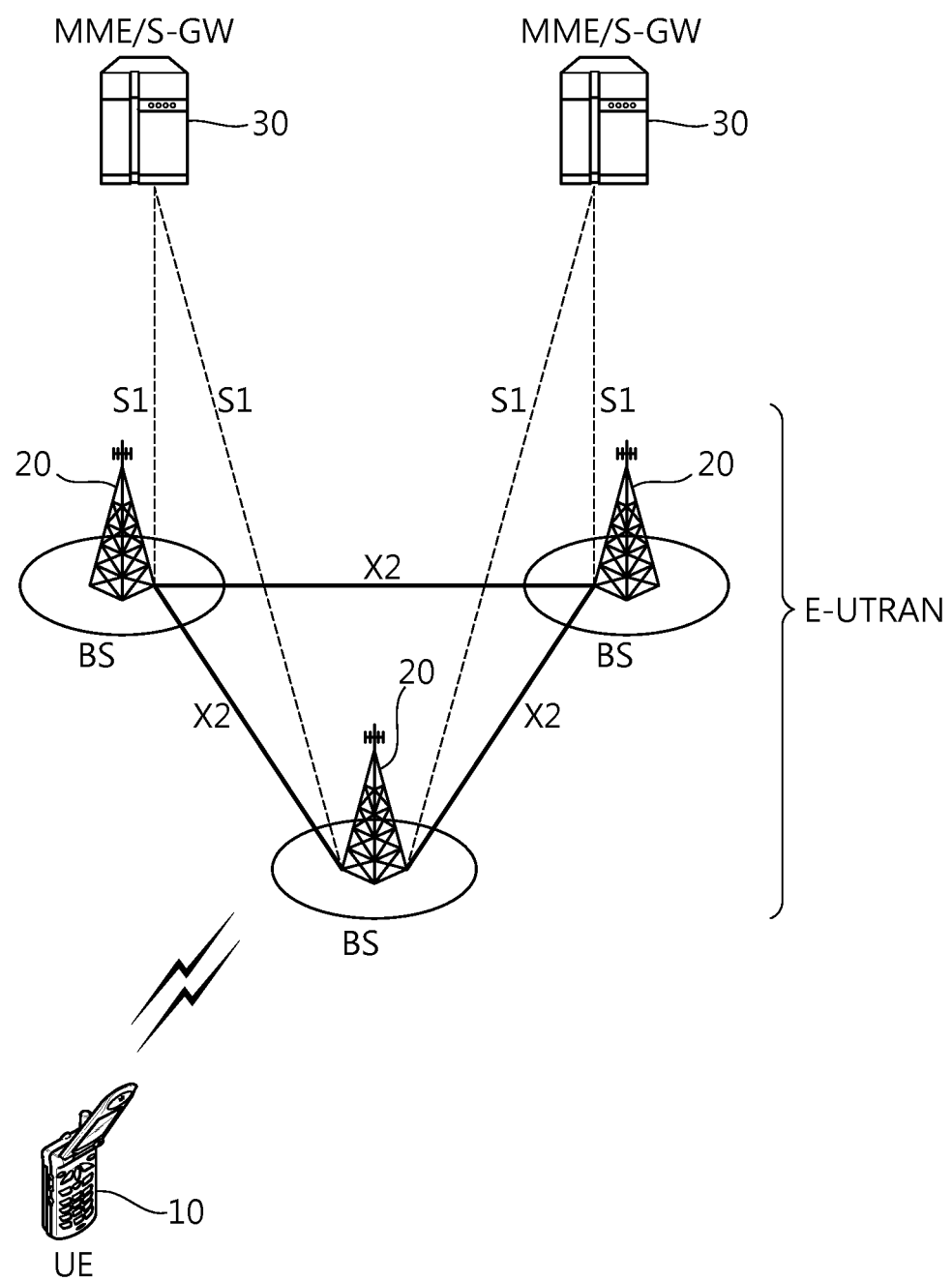
FIG. 1 is a block diagram showing a wireless communication system.

FIG. 1 is a block diagram showing a wireless communication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

Figure 2:
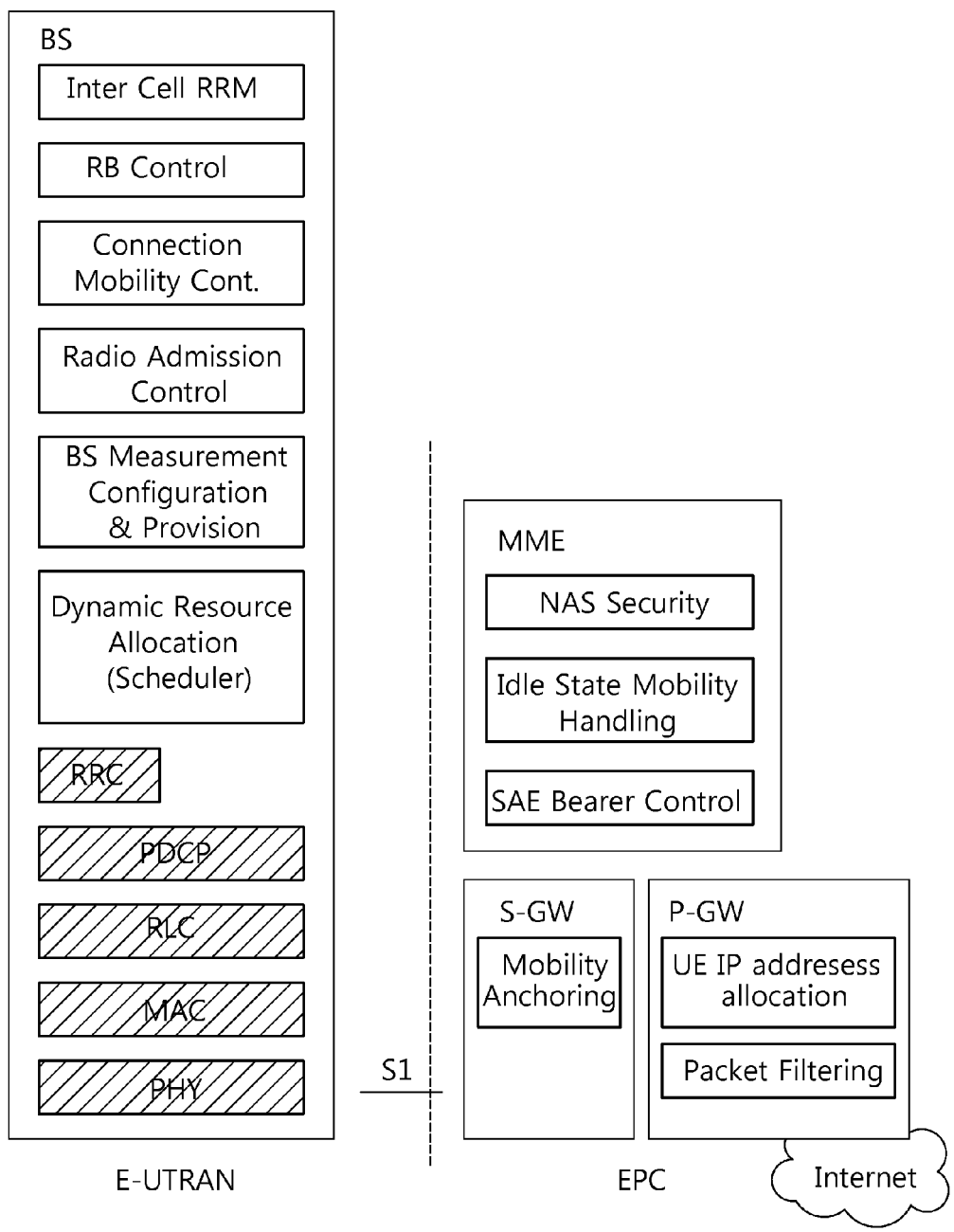
FIG. 2 is a block diagram showing functional split between the E-UTRAN and the EPC.

FIG. 2 is a block diagram showing functional split between the E-UTRAN and the EPC. Slashed boxes depict radio protocol layers and white boxes depict the functional entities of the control plane. A BS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling. The MME hosts the following functions. (1) NAS (Non-Access Stratum) signaling, (2) NAS signaling security, (3) Idle mode UE Reachability, (4) Tracking Area list management, (5) Roaming and (6) Authentication. The S-GW hosts the following functions. (1) Mobility anchoring and (2) lawful interception. The PDN gateway (P-GW) hosts the following functions. (1) UE IP (internet protocol) allocation and (2) packet filtering.

Figure 3:
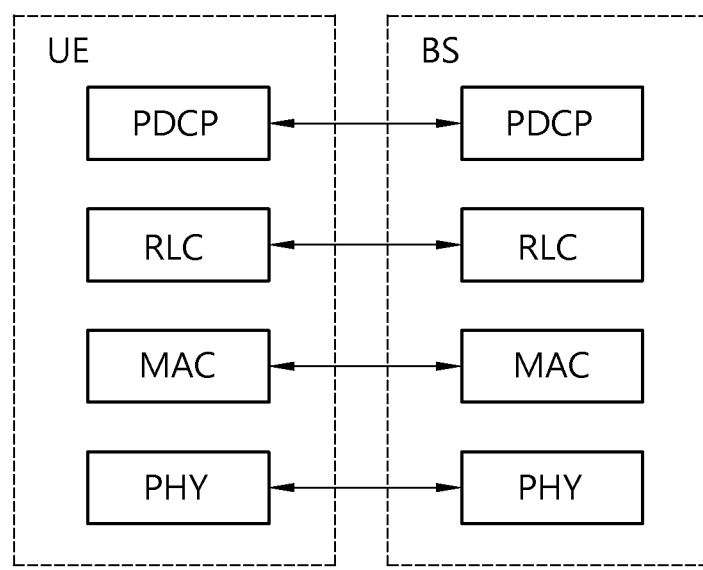
FIG. 3 is a block diagram showing radio protocol architecture for a user plane.
Figure 4:
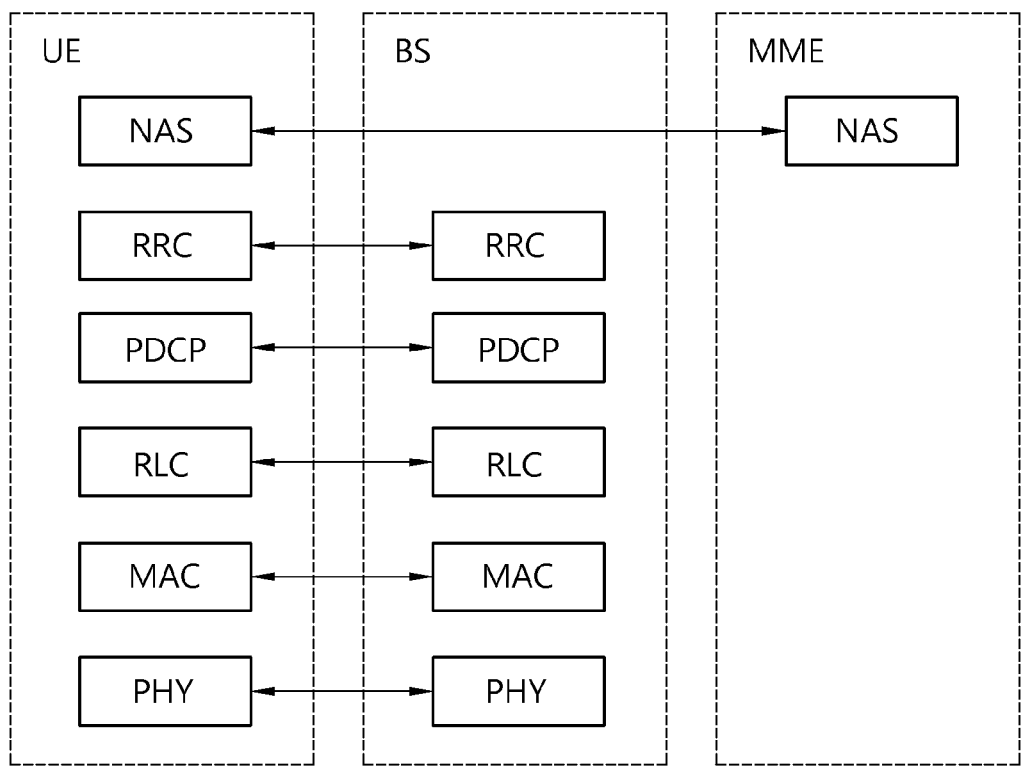
FIG. 4 is a block diagram showing radio protocol architecture for a control plane.

FIG. 3 is a block diagram showing radio protocol architecture for a user plane. FIG. 4 is a block diagram showing radio protocol architecture for a control plane. The data plane is a protocol stack for user data transmission and the control plane is a protocol stack for control signal transmission.

Referring to FIGS. 3 and 4, a physical (PHY) layer provides information transfer services to an upper layer by using a physical channel. The PHY layer is connected with a MAC (Medium Access Control) layer, i.e., an upper layer of the PHY layer, through transport channels. Data is transferred between the MAC layer and the PHY layer through the transport channels. The transport channels are classified by how and with what characteristics data are transferred over the radio interface. Between different physical layers, i.e., the physical layer of a transmitter and the physical layer of a receiver, data is transferred through the physical channel.

There are several physical control channels used in the physical layer. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NACK signals in response to uplink transmissions. A physical uplink control channel (PUCCH) carries uplink control information such as HARQ ACK/NACK in response to downlink transmission, scheduling request and channel quality indicator (CQI). A physical uplink shared channel (PUSCH) carries uplink shared channel (UL-SCH).

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels. Logical channels may be classified into two groups: control channels for the transfer of control plane information and traffic channels for the transfer of user plane information.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ) scheme.

The functions of a PDCP (Packet Data Convergence Protocol) layer for the user plane include transfer of user data, header compression/decompression and ciphering/deciphering. The functions of the PDCP layer for the control plane include transfer of control plane data, and ciphering and integrity protection.

The RRC (Radio Resource Control) layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

A NAS (Non-Access Stratum) layer belonging to the upper layer of the RRC layer serves to perform session management and mobility management.

Figure 5:
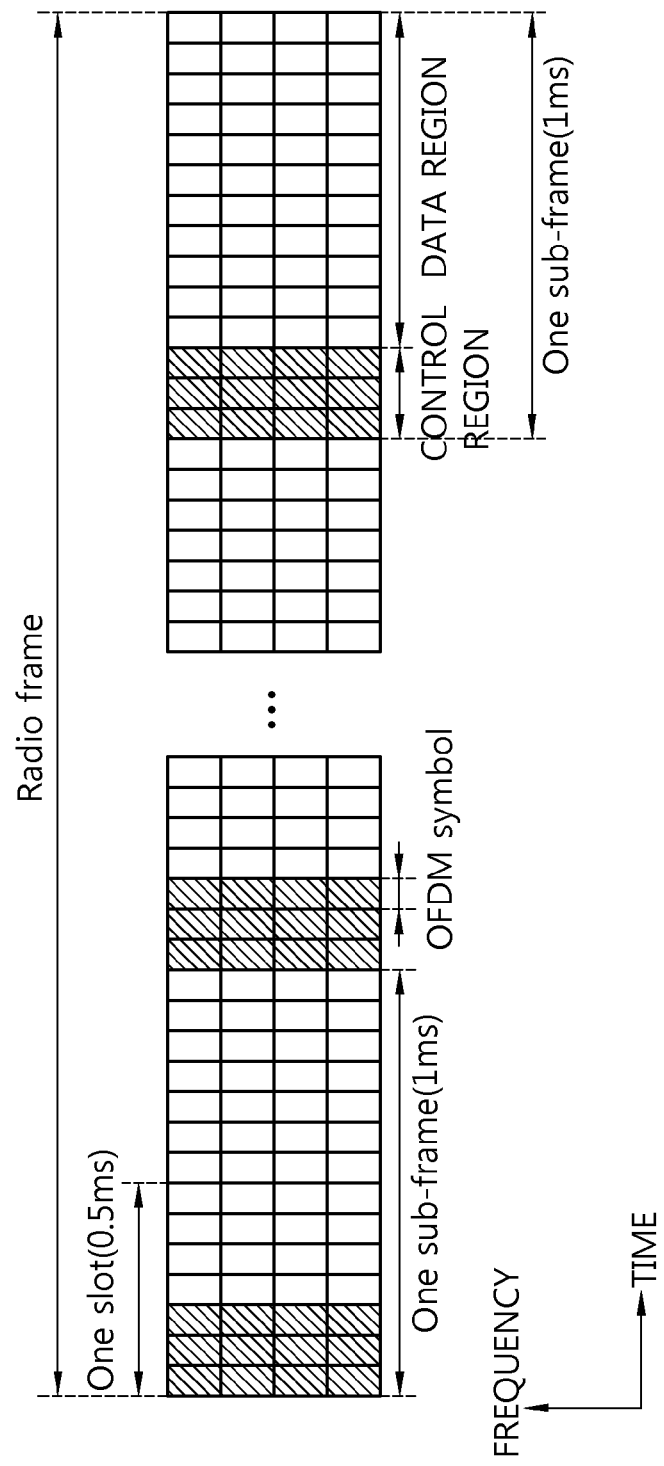
FIG. 5 shows an example of a radio frame structure.

FIG. 5 shows an example of a radio frame structure.

Referring to FIG. 5, a radio frame includes 10 subframes, and a subframe includes 2 slots. The time used to transmit a subframe is referred to as a transmission time interval (TTI). For example, the length of a subframe is 1 ms and the length of a slot can be 0.5 ms.

One slot includes a plurality of orthogonal frequency division multiplexing (OFDM) symbols in time domain. In a normal cyclic prefix (CP), a slot includes 7 OFDM symbols, and in an extended CP, a slot includes 7 OFDM symbols.

An OFDM symbol is for expression of a symbol duration in time domain because OFDMA is used for downlink transmission in 3GPP LTE, the OFDM symbol can be regarded as a SC-FDMA symbol or symbol duration.

A resource block is a unit of resource assignment in 3GPP LTE, and it includes a plurality of consecutive subcarriers, i.e. 12 subcarriers, in a slot.

As shown in 3GPP TS 36.211 V8.5.0 (2008-12) "Evolved Universal Terrestrial Radio Access (E-UTRA); Physical Channels and Modulation (Release 8)", a physical channel in LTE is divided into PDSCH (Physical Downlink Shared Channel), PUSCH (Physical Uplink Shared Channel) and PDSCH (Physical Downlink Control Channel) 과 PUCCH (Physical Uplink Control Channel).

A subframe is divided into a control region and a data region in time domain. The control region comprises at most three OFDM symbols in a first slot of a subframe, and the number of OFDM symbols in the control region can be various. PDCCH is allocated to the control region, and PDSCH is allocated to the data region.

Figure 6:
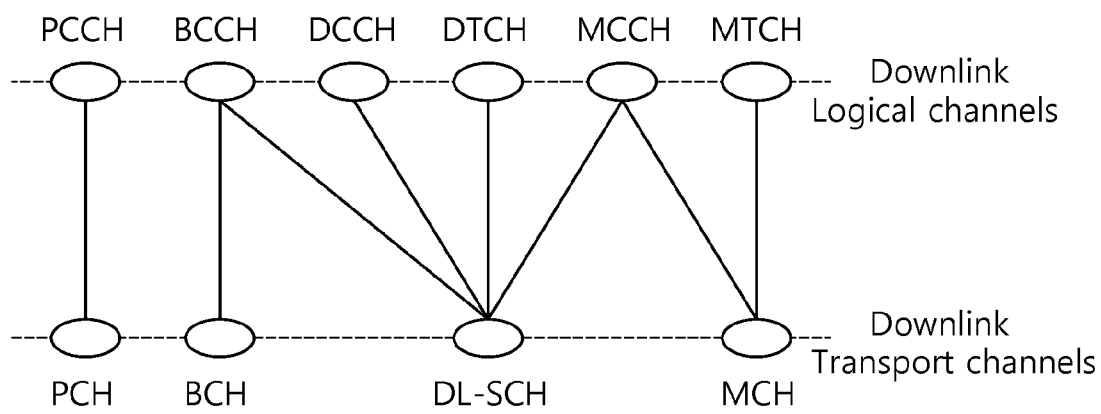
FIG. 6 shows mapping between downlink logical channels and downlink transport channels.

FIG. 6 shows mapping between downlink logical channels and downlink transport channels.

Referring to FIG. 6, a paging control channel (PCCH) can be mapped to a paging channel (PCH). A broadcast control channel (BCCH) can be mapped to a broadcast channel (BCD) or a downlink shared channel (DL-SCH). A common control channel (CCCH), a dedicated control channel (DCCH), a dedicated traffic channel (DTCH), a multicast control channel (MCCH) and a multicast traffic channel (MTCH) can be mapped to the DL-SCH. The MCCH and MTCH can also be mapped to a multicast channel (MCH).

Each logical channel type is defined by what type of information is transferred. A classification of logical channels is into two groups: control channels and traffic channels.

Control channels are used for transfer of control plane information. The BCCH is a downlink control channel for broadcasting system control information. The PCCH is a downlink channel that transfers paging information and is used when the network does not know the location cell of the UE. The CCCH is a channel for transmitting control information between UEs and a network and is used for UEs having no RRC connection with the network. The MCCH is a point-to-multipoint downlink channel used for transmitting multimedia broadcast multicast service (MBMS) control information from the network to the UE for one or several MTCHs and is only used by UEs that receive MBMS. The DCCH is a point-to-point bi-directional channel that transmits dedicated control information between a UE and the network and is used by UEs having an RRC connection.

Traffic channels are used for the transfer of user plane information. The DTCH is a point-to-point channel dedicated to one UE, for the transfer of user information. The DTCH can exist in both uplink and downlink. The MTCH is a point-to-multipoint downlink channel for transmitting traffic data from the network to the UE and is only used by UEs that receive MBMS.

The transport channels are classified by how and with what characteristics data are transferred over the radio interface. The BCH is broadcasted in the entire coverage area of the cell and has fixed, pre-defined transport format. The DL-SCH is characterized by support for hybrid automatic repeat request (HARQ), support for dynamic link adaptation by varying the modulation, coding and transmit power, possibility to be broadcast in the entire cell, possibility to use beamforming, support for both dynamic and semi-static resource allocation, support for UE discontinuous reception (DRX) to enable UE power saving and support for MBMS transmission. The PCH is characterized by support for UE discontinuous reception (DRX) to enable UE power saving and requirement to be broadcast in the entire coverage area of the cell. The MCH is characterized by requirement to be broadcast in the entire coverage area of the cell, support for MBMS Single Frequency Network (MBSFN) combining of MBMS transmission on multiple cells.

Figure 7:
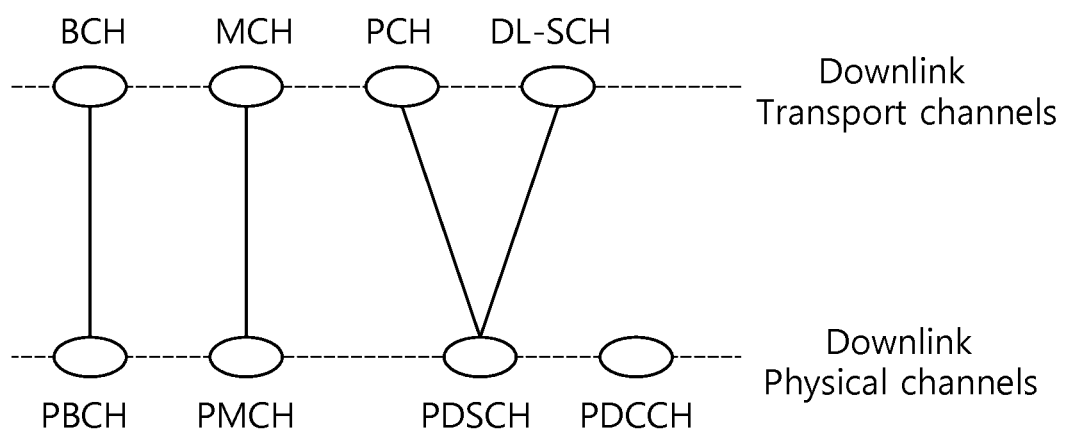
FIG. 7 shows mapping between downlink transport channels and downlink physical channels.

FIG. 7 shows mapping between downlink transport channels and downlink physical channels.

Referring to FIG. 7, a BCH can be mapped to a physical broadcast channel (PBCH). A MCH can be mapped to a physical multicast channel (PMCH). A PCH and a DL-SCH can be mapped to a physical downlink shared channel (PDSCH). The PBCH carries the BCH transport block. The PMCH carries the MCH. The PDSCH carries the DL-SCH and PCH.

A multimedia broadcast multicast service (MBMS) uses two logical channels, that is, an MCCH (i.e., a control channel) and an MTCH (i.e., a traffic channel). User data (e.g., actual voice or video) is transmitted on the MTCH. Configuration information for receiving the MTCH is transmitted on the MCCH. The MTCH and the MCCH are point-to-multipoint downlink channels for a plurality of UEs and can be regarded as common channels. In the MBMS, an amount of allocated radio resources does not coincide with the number of UEs receiving services. Instead, only radio resources for the common channels are allocated and the common channels are simultaneously received by the plurality of UEs, thereby improving efficiency of the radio resources.

Figure 8:
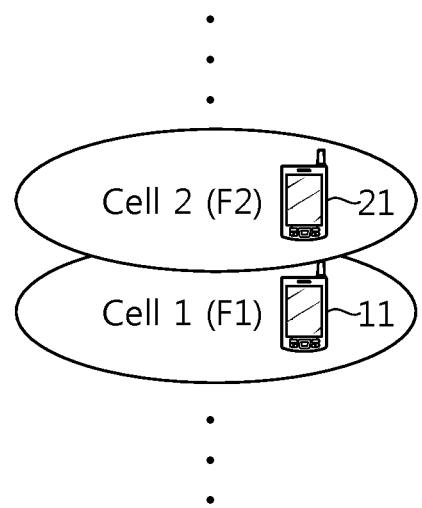
FIG. 8 shows an example of a hierarchical cell structure for providing an MBMS service.

FIG. 8 shows an example of a hierarchical cell structure for providing an MBMS service.

Referring to FIG. 8, a first cell (i.e., a cell 1) and a second cell (i.e., a cell 2) constitute a hierarchical cell structure in which these cells are co-located. The cell 1 communicates with a first UE 11 over a radio frequency band F1, and the cell 2 communicates with a second UE 21 over a radio frequency band F2. That is, the cell 1 and the cell 2 provide services to the respective UEs by using different radio frequency bands. In a multi-carrier system, F1 corresponds to a first carrier, and F2 corresponds to a second carrier.

A cell is classified into a mixed-cell, an MBMS cell, and a unicast cell according to a service type. The mixed-cell is a cell that provides both an MBMS service and a unicast service. The MBMS cell is a cell that provides only the MBMS service. The unicast cell is a cell that provides only the unicast service.

If both the cell 1 and the cell 2 are mixed-cells or MBMS cells, both the first UE 11 and the second UE 12 can receive MBMS services. However, if any one of the cell 1 and the cell 2 is a mixed-cell or an MBMS cell and the other one is a unicast cell, a UE located in the unicast cell cannot receive an MBMS service. For example, if it is assumed that the cell 1 is a unicast cell, the cell 2 is a mixed-cell, and the cell 2 provides an MBMS service, then the second UE 12 receives the MBMS service whereas the first UE 11 cannot receive the MBMS service. In this case, the cell 1 may transmit control information regarding the MBMS service by using an additional control channel dedicated to the MBMS (e.g., an MBMS control channel (MCCH)) so that the first UE 11 can receive the MBMS service. However, although the cell 1 does not provide the MBMS service, the cell 1 has to transmit information regarding the MBMS with the additional control channel dedicated to the MBMS (e.g., the MCCH) only for the first UE 11, and thus resource efficiency of the cell 1 deteriorates.

In this case, if the cell 1 reports information regarding the cell 2 by using at least one of a broadcast channel, a paging channel, and a PDCCH, the first UE 11 can receive MBMS information from the cell 2. That is, the cell 1 can obtain an effect of providing the MBMS service without having to add the additional channel dedicated to the MBMS.

Figure 9:
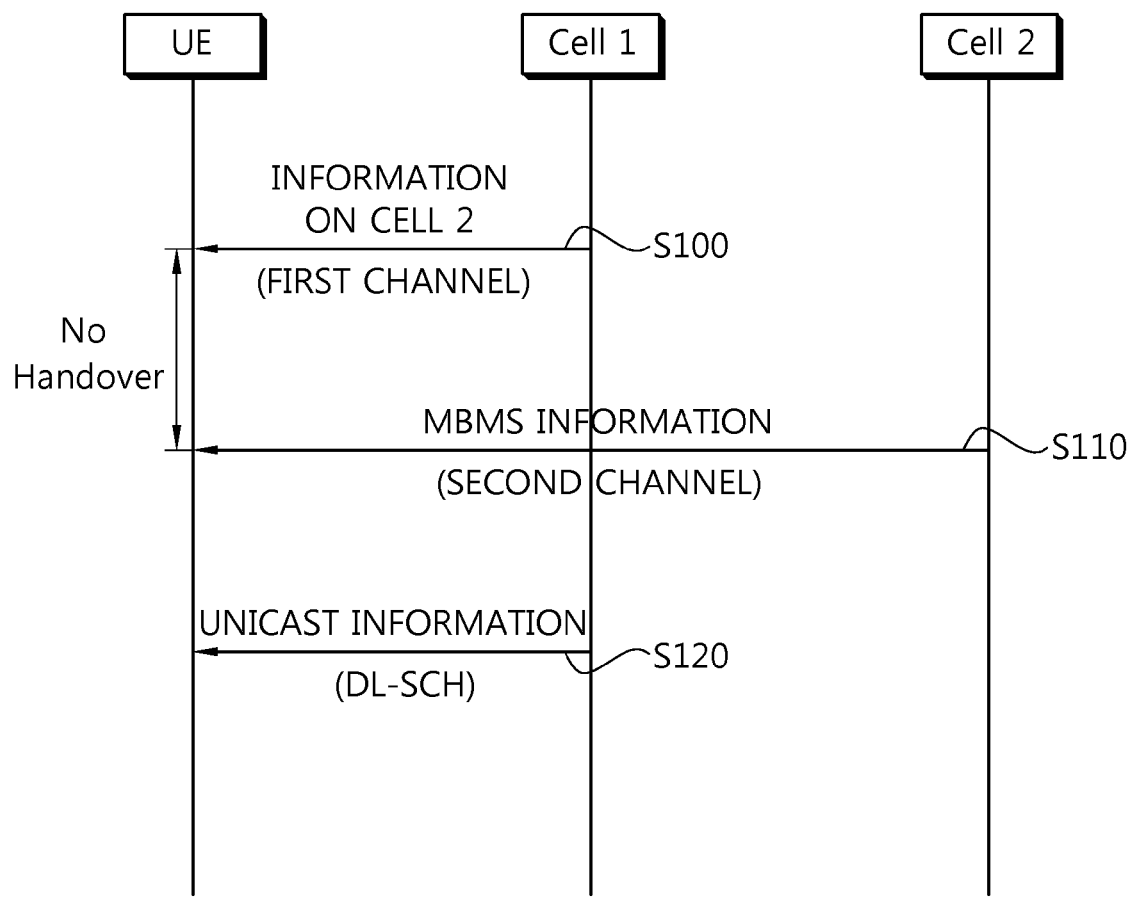
FIG. 9 is a flowchart showing a method of receiving MBMS information according to an embodiment of the present invention.

FIG. 9 is a flowchart showing a method of receiving MBMS information according to an embodiment of the present invention.

Referring to FIG. 9, a cell 1 transmits information regarding a cell 2 to a UE over a first channel (step S100). Herein, the cell 1 is a cell that does not provide an MBMS service (i.e., a unicast cell), and the cell 2 is a cell that provides the MBMS service (i.e., a mixed-cell or an MBMS cell). Further, a radio frequency band (or first carrier) allocated to the cell 1 is different from a radio frequency band (or second carrier) allocated to the cell 2, and the cell 1 and the cell 2 constitute a hierarchical cell structure. The first carrier and the second carrier can be transmitted by carrier aggregation. In this case, various skills regarding the carrier aggregation can be used.

The information regarding the cell 2 includes at least one of an MBMS cell identifier used to identify that the cell 2 is a cell for providing the MBMS service, frequency (or carrier) information for transmitting the MBMS service of the cell 2, and information indicating which MBMS service's session starts, changes, or ends. Therefore, by using the information regarding the cell 2, the UE can know whether the cell 2 provides the MBMS service, over which carrier (or frequency) the MBMS service is transmitted, and detailed information regarding an MBMS service session.

The first channel is a channel for transmitting the information regarding the cell 2, and includes several examples as follows. For one example, the first channel is a broadcast channel for broadcasting system information (SI). The broadcast channel is received by all UEs irrespective of a UE state. That is, the broadcast channel is received even if the UE operates in a sleep mode. Even if the UE is in the sleep mode, the UE can receive MBMS information from the cell 2 when information regarding the cell 2 is obtained over the broadcast channel.

For another example, the first channel is a paging channel (PCH).

For another example, the first channel is a physical downlink control channel (PDCCH). The PDCCH is masked by a specific radio network temporary identifier (RNTI), and is thus demasked by using the specific RNTI. The UE receives a PDCCH indicating an MBMS-RNTI (M-RNTI) from the cell 1, and the PDCCH indicating the M-RNTI may report information that the cell 2 provides an MBMS service. In this case, the PDCCH may transmit an identifier of a cell (or carrier) for all MCCH channels or a specific MCCH channel, and may report which MCCH of the cell 2 is modified.

The cell 2 transmits MBMS information to the UE over a second channel of the cell 2 (step S110). In this case, the MBMS information is transmitted on the basis of the information regarding the cell 2, and the UE may receive the MBMS information irrespective of a handover from the cell 1 to the cell 2. The UE may receive the MBMS information in various manners, which will be described below with reference to FIG. 10. The MBMS information is information related to MBMS transmission of the cell 2, and includes at least one of control information regarding the MBMS, service information regarding the MBMS, and traffic data of the MBMS.

For one example, the second channel may be an MBMS control channel (MCCH), and the MBMS information may be MCCH information transmitted over the MCCH. The MCCH information includes critical information and non-critical information. The critical information and the non-critical information are identified by a modification time and a modification period. The critical information is transmitted in every repetition period, and may be modified when a modification period starts. Examples of the critical information include MBMS change information, MBMS service information, MBMS radio bearer information, MBMS current cell information, and MBMS neighboring cell information. On the other hand, the non-critical information is transmitted in an access information period, and may be modified at any transmission time. An example of the non-critical information includes MBMS access information.

For another example, the second channel may be an MBMS traffic channel (MTCH), and the MBMS information may be traffic data of MBMS.

For another example, the second channel is a PDCCH, and the MBMS information includes an MCCH change indicator indicating that the MCCH information changes and/or an identifier of a cell (or carrier) for all MCCHs or a specific MCCH when several MBMS cells (or carriers) exist. The MCCH change indicator serves to report in advance that MCCH critical information is scheduled to be modified.

The cell 1 independently transmits unicast information to the UE over a DL-SCH (step S120). Since the cell 1 is a unicast cell, the cell 1 transmits the unicast information to the UE regardless that MBMS information is transmitted from the cell 2, and the UE can receive simultaneously or separately the unicast information and the MBMS information according to reception capability.

As such, when MBMS information and the control information on the MBMS information (i.e. a cell and frequency (or carrier) for transmitting the MBMS information) are transmitted in different cells in a separate manner, there is an advantage in that the MBMS information can be received without performing a mobility procedure such as an additional inter-frequency handover.

Figure 10:
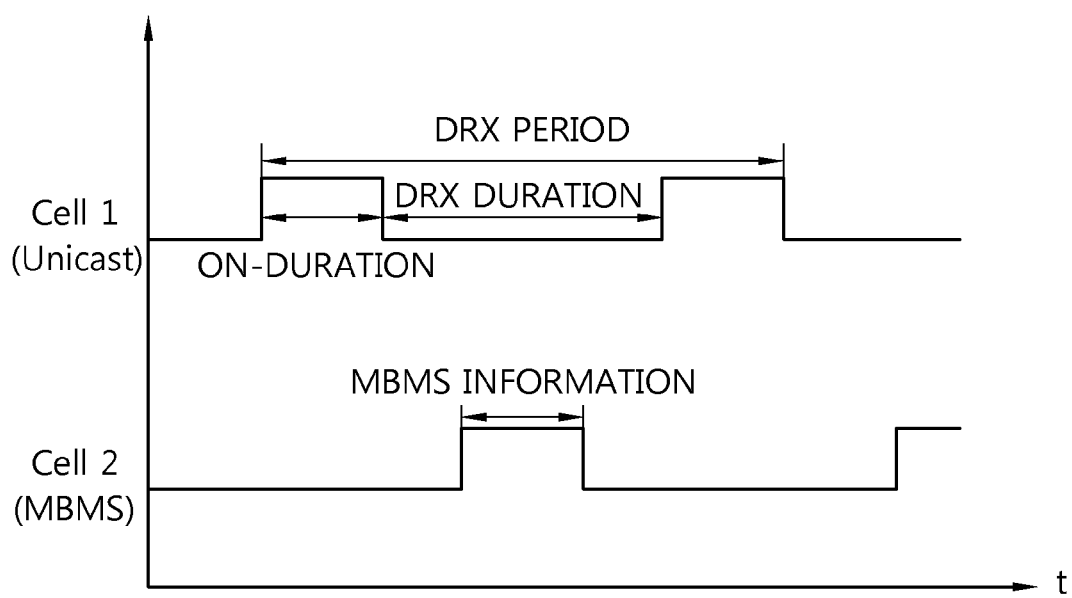
FIG. 10 is a diagram for explaining a method of receiving MBMS information by using a discontinuous reception (DRX) mechanism according to an embodiment of the present invention.

FIG. 10 is a diagram for explaining a method of receiving MBMS information by using a discontinuous reception (DRX) scheme according to an embodiment of the present invention. The DRX scheme is a function by which a UE stops a receiving operation and enters a sleep or idle mode to reduce power consumption of the UE. In a 3GPP WCDMA system, a UE state is classified into CELL_DCH, CELL_FACH, CELL_PCH, URA_PCH, and UTRA_IDLE, and the UE operates according to the DRX scheme when in CELL_FACH, CELL_PCH, and URA_PCH. Meanwhile, in a 3GPP LTE system, a radio resource control (RRC) state is simplified to RRC_IDLE and RRC_CONNECTED in order to effectively manage radio resources.

Referring to FIG. 10, a cell 1 is a unicast cell and is in a DRX mode. A cell 2 is a mixed-cell or an MBMS cell, and transmits MBMS information. It is assumed that the UE uses the cell 1 as a serving cell and is in the DRX mode. The UE repeats an on-duration and a DRX duration according to a DRX period. The on-duration denotes a time in which the UE wakes up to continuously receive data. The DRX period denotes a period in which the on-duration is repeated. The UE performs an operation of receiving a PDCCH in the on-duration defined by a BS. If effective control information is not received in the defined time duration, the UE operates in the idle mode according to the DRX scheme.

With regard to receiving MBMS information of the cell 2, the UE receives the MBMS information of the cell 2 in a DRX duration for a downlink channel of the cell 1 in order to avoid simultaneous reception of the cell 1 (or first carrier) and the cell 2 (or second carrier).

Figure 11:
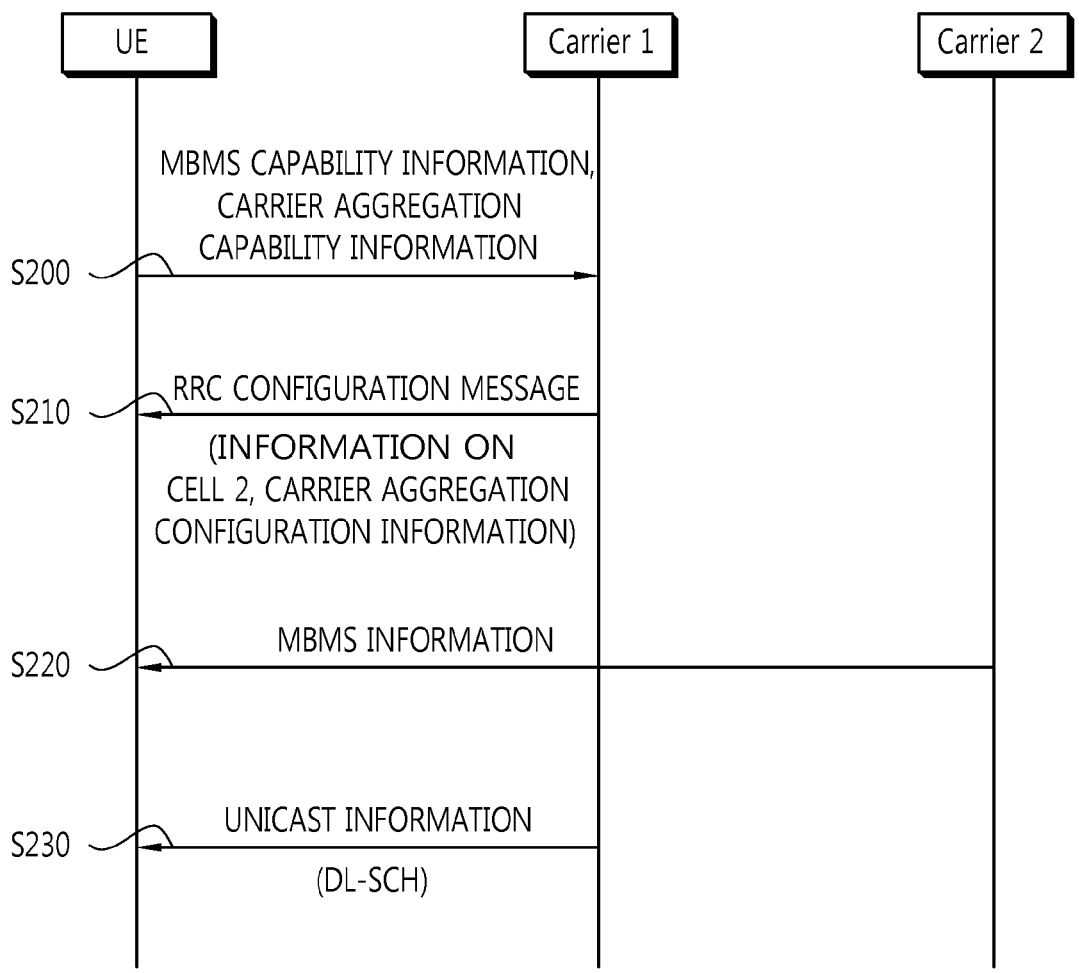
FIG. 11 is a flowchart showing a method of receiving MBMS information according to another embodiment of the present invention.

FIG. 11 is a flowchart showing a method of receiving MBMS information according to another embodiment of the present invention. Herein, a first carrier (i.e., a carrier 1) and a second carrier (i.e., a carrier 2) may be respectively managed by different BSs (or different cells), or may be managed by the same BS (or same cell). For clarity, it is assumed hereinafter that the carrier 1 is transmitted from a cell 1 and the carrier 2 is transmitted from a cell 2.

Referring to FIG. 11, a UE transmits MBMS capability information and carrier aggregation capability information to a radio access network (RAN) by using an uplink resource (i.e., an uplink carrier) corresponding to the carrier 1 (step S200). The MBMS capability information indicates whether an MBMS service is supported. The carrier aggregation capability information indicates whether reception based on the carrier aggregation is supported.

When the UE supports the MBMS service and the reception based on the carrier aggregation, the RAN transmits to the UE an RRC configuration message including information regarding the cell 2 (or information regarding the carrier 2) and carrier aggregation configuration information (step S210). If the carrier 2 is a carrier for transmitting the MBMS information, the RAN transmits the RRC configuration message to the UE so that the UE configures the carrier 1 and the carrier 2 by using carrier aggregation, and thus the UE can simultaneously receive the carrier 1 and the carrier 2. The RRC configuration message is delivered to the UE over a DCCH channel which is a logical channel. The RRC configuration message may include system information or may be system information itself. The RRC configuration message may report that the MBMS information is transmitted over the carrier 2. The RRC configuration message may further include information regarding which MBMS service's session starts/changes/ends.

The RAN transmits the MBMS information to the UE over the carrier 2 (step S220). The MBMS information is transmitted on the basis of the information regarding the cell 2, and the UE can receive the MBMS information irrespective of a handover from the carrier 1 to the carrier 2. Details of the MBMS information is the same as that described above with reference to FIG. 9. The UE may receive the MBMS information on the basis of the DRX mode for the carrier 1.

The RAN transmits unicast information over the carrier 1 (step S230). The UE may simultaneously or separately receive the unicast information and the MBMS information according to reception capability.

According to the present invention, information regarding a cell that transmits multimedia broadcast/multicast service (MBMS) information is obtained from a cell that does not transmit the MBMS information, thereby eventually receiving the MBMS information. Therefore, an overhead caused by broadcasting of unnecessary MBMS control information can be reduced.

What is claimed is:

1. A method of receiving multimedia broadcast/multicast service (MBMS) information by a user equipment (UE) in a wireless communication system, the method comprising:
    transmitting, to a first cell, MBMS capability information and carrier aggregation capability information, the MBMS capability information indicating whether the UE supports a reception of the MBMS information, the carrier aggregation capability information indicating whether the UE supports the reception of the MBMS information using a carrier aggregation scheme;
    receiving MBMS cell information on a second cell from the first cell over a first channel, the MBMS cell information including an MBMS cell identifier for identifying that the second cell is a cell providing a MBMS, frequency information for transmitting the MBMS of the second cell, and information indicating which MBMS session starts, changes, or ends,
    wherein the first channel is a physical downlink control channel (PDCCH), and
    wherein the PDCCH is masked by an MBMS radio network temporary identifier (M-RNTI) indicating that the second cell provides the MBMS information; and
    receiving the MBMS information from the second cell over a second channel based on the received MBMS cell information, the MBMS information including at least one of control information on the MBMS, service information on the MBMS and traffic data of the MBMS,
    wherein the first cell does not provide the MBMS, and the second cell provides the MBMS,
    wherein the first cell and the second cell are co-located and constitute a hierarchical cell structure,
    wherein a first frequency band allocated to the first cell is different from a second frequency band allocated to the second cell, the first frequency band and the second frequency band being transmitted by a carrier aggregation, and
    wherein the MBMS information is received in a discontinuous reception (DRX) duration in which a unicast service is not transmitted from the first cell.

2. The method of claim 1, wherein the second channel is one of a physical downlink control channel (PDCCH), an MBMS control channel (MCCH), and an MBMS traffic channel (MTCH).

3. The method of claim 2, wherein the second channel is the MCCH,
    wherein the MBMS information is MCCH information, and
    wherein the MCCH information includes critical information and non-critical information identified by a modification time and a modification period.

4. The method of claim 2, wherein the second channel is the MTCH, and
    wherein the MBMS information is the traffic data of the MBMS.

5. The method of claim 1, wherein receiving the MBMS information from the second cell is performed irrespective of an inter-frequency handover from the first frequency band to the second frequency band.

6. The method of claim 1, wherein the MBMS cell information on the second cell is included in a radio resource control (RRC) configuration message, and the RRC configuration message further comprises carrier aggregation configuration information for configuring the first frequency band and the second frequency band based on the carrier aggregation.

7. A method of transmitting multimedia broadcast/multicast service (MBMS) information from a radio access network in a wireless communication system, the method comprising:

receiving, from a user equipment (UE), MBMS capability information and carrier aggregation capability information, the MBMS capability information indicating whether the UE supports a reception of the MBMS information, the carrier aggregation capability information indicating whether the UE supports the reception of the MBMS information using a carrier aggregation scheme;

transmitting MBMS cell information on a second cell to the user equipment (UE) over a first channel of a first cell, the MBMS cell information including an MBMS cell identifier for identifying that the second cell is a cell providing a MBMS, frequency information for transmitting the MBMS of the second cell, and information indicating which MBMS session starts, changes, or ends, wherein the first channel is a physical downlink control channel (PDCCH), and wherein the PDCCH is masked by an MBMS radio network temporary identifier (M-RNTI) indicating that the second cell provides the MBMS information; and transmitting the MBMS information to the UE over a second channel of the second cell, in association with the transmitted MBMS cell information, the MBMS information including at least one of control information on the MBMS, service information on the MBMS and traffic data of the MBMS, wherein the first cell does not provide the MBMS, and the second cell provides the MBMS, wherein the first cell and the second cell are co-located and constitute a hierarchical cell structure, wherein a first frequency band allocated to the first cell is different from a second frequency band allocated to the second cell, the first frequency band and the second frequency band being transmitted by a carrier aggregation, and wherein the MBMS information is transmitted in a discontinuous reception (DRX) duration in which a unicast service is not transmitted from the first cell.

\* \* \* \* \*